United States Patent
Ehsan et al.

(10) Patent No.: US 9,019,880 B2
(45) Date of Patent: Apr. 28, 2015

(54) METHODS AND APPARATUS FOR OVERLOAD MITIGATION USING UPLINK TRANSMIT POWER BACKOFF

(75) Inventors: Navid Ehsan, San Diego, CA (US); Thomas Klingenbrunn, San Diego, CA (US); Jon James Anderson, Boulder, CO (US); Deepak Krishnamoorthi, San Diego, CA (US); Gang Andy Xiao, San Diego, CA (US); Pradeep Sagane Gowda, San Diego, CA (US); Vijay Balasubramanian, San Diego, CA (US); Zhu Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 13/570,314

(22) Filed: Aug. 9, 2012

(65) Prior Publication Data
US 2013/0039173 A1 Feb. 14, 2013

Related U.S. Application Data

(60) Provisional application No. 61/522,615, filed on Aug. 11, 2011.

(51) Int. Cl.
*G08C 17/00* (2006.01)
*H04W 52/14* (2009.01)
(Continued)

(52) U.S. Cl.
CPC .......... *H04W 52/146* (2013.01); *H04W 52/325* (2013.01); *H04W 52/367* (2013.01); *H04W 52/60* (2013.01); *Y02B 60/50* (2013.01)

(58) Field of Classification Search
CPC . H04W 52/02; H04W 52/0203; H04W 84/12; H04W 52/46; H04W 80/04; H04W 84/18; H04W 88/06; H04W 74/08; H04B 7/18543

USPC ........... 370/311, 229, 318, 338; 455/522, 69, 455/127.1, 343.1, 450
See application file for complete search history.

(56) References Cited

U.S. PATENT DOCUMENTS

| | | | |
|---|---|---|---|
| 6,891,800 B1 | 5/2005 | Vollmer et al. | |
| 8,015,306 B2 | 9/2011 | Bowman | |

(Continued)

FOREIGN PATENT DOCUMENTS

| | | | |
|---|---|---|---|
| JP | H09326749 A | 12/1997 | |
| JP | H10145865 A | 5/1998 | |

(Continued)

OTHER PUBLICATIONS

International Search Report and Written Opinion—PCT/US2012/050228—ISA/EPO—Sep. 25, 2012.

(Continued)

*Primary Examiner* — Dady Chery
(74) *Attorney, Agent, or Firm* — Patterson & Sheridan, L.L.P.

(57) ABSTRACT

Certain aspects of the disclosure relate generally to uplink flow control of wireless devices for mitigation of overload issues. A user equipment (UE) may reduce an average transmit power for the uplink channel based on whether an overload metric (e.g., temperature metric) exceeds a threshold value. The UE may perform duty cycling for an uplink control channel when an overactive uplink control channel is a dominating factor in a thermal issue. The UE may further reduce a maximum power transmit limit (MTPL) for one or more uplink channels, such as physical uplink control channel (PUCCH) and physical uplink shared channel (PUSCH).

40 Claims, 8 Drawing Sheets

(51) Int. Cl.
*H04W 52/32* (2009.01)
*H04W 52/36* (2009.01)
*H04W 52/60* (2009.01)

(56) References Cited

U.S. PATENT DOCUMENTS

| | | |
|---|---|---|
| 8,019,295 B2 | 9/2011 | Fan |
| 2004/0085940 A1 | 5/2004 | Black et al. |
| 2005/0078651 A1 | 4/2005 | Lee et al. |
| 2006/0245352 A1 | 11/2006 | Kang et al. |
| 2008/0151797 A1* | 6/2008 | Camp ............... 370/311 |
| 2009/0092202 A1 | 4/2009 | Kim et al. |
| 2009/0097444 A1 | 4/2009 | Lohr et al. |
| 2009/0103479 A1 | 4/2009 | Goto et al. |
| 2009/0125650 A1 | 5/2009 | Sebire |
| 2009/0215442 A1 | 8/2009 | Lindoff et al. |
| 2009/0280798 A1 | 11/2009 | Meylan et al. |
| 2009/0290625 A1 | 11/2009 | Riddle et al. |
| 2010/0135166 A1 | 6/2010 | Ahluwalia |
| 2010/0135229 A1 | 6/2010 | Lohr et al. |
| 2010/0284314 A1 | 11/2010 | Pelletier et al. |
| 2010/0302946 A1 | 12/2010 | Yang et al. |
| 2010/0323743 A1* | 12/2010 | Huan ............... 455/522 |
| 2011/0242972 A1 | 10/2011 | Sebire et al. |
| 2011/0243002 A1 | 10/2011 | Tsuruoka |
| 2011/0296064 A1 | 12/2011 | Ehsan et al. |
| 2012/0020286 A1 | 1/2012 | Damnjanovic et al. |
| 2012/0320745 A1 | 12/2012 | Shi et al. |

FOREIGN PATENT DOCUMENTS

| | | |
|---|---|---|
| JP | 2005151576 A | 6/2005 |
| JP | 2009105570 A | 5/2009 |
| JP | 2011514047 A | 4/2011 |
| JP | 2011139494 A | 7/2011 |
| JP | 2012526431 A | 10/2012 |
| JP | 2012531077 A | 12/2012 |
| WO | WO-0031990 A2 | 6/2000 |
| WO | WO2005083955 A1 | 9/2005 |
| WO | WO-2007058178 A1 | 5/2007 |
| WO | WO2008008799 | 1/2008 |
| WO | WO2008016774 A2 | 2/2008 |
| WO | WO-2008156198 A2 | 12/2008 |
| WO | WO2009059995 A1 | 5/2009 |
| WO | WO2009106490 A1 | 9/2009 |
| WO | WO-2010016418 A1 | 2/2010 |
| WO | WO-2010127725 A1 | 11/2010 |
| WO | WO-2010146552 A1 | 12/2010 |
| WO | WO-2010148319 A1 | 12/2010 |
| WO | WO-2011091239 | 7/2011 |

OTHER PUBLICATIONS

Samsung: "Description of EUL scheduler", 3GPP Draft; R1-040698 Description of EUL Scheduler, 3rd Generation Partnership Project (3GPP), Mobile Competence Centre; 650, Route Des Lucioles; F-06921 Sophia-Antipolis Cedex; France, vol. RAN WGI, no. Cannes; 20040619, Jun. 19, 2004, XP050112113, [retrieved on Jun. 19, 2004].

* cited by examiner

METHODS AND APPARATUS FOR OVERLOAD MITIGATION USING UPLINK TRANSMIT POWER BACKOFF

CLAIM OF PRIORITY UNDER 35 U.S.C. §119

The present Application for Patent claims benefit of priority to U.S. Provisional Application No. 61/522,615 entitled, "METHODS AND APPARATUS FOR OVERLOAD MITIGATION USING UPLINK TRANSMIT POWER BACKOFF," filed Aug. 11, 2011, and assigned to the assignee hereof and hereby expressly incorporated by reference herein.

BACKGROUND

1. Field

Certain aspects of the disclosure relate generally to wireless communications systems and, more particularly, to methods and apparatus for uplink flow control for mitigating overload of radio components (e.g., for reducing overheating issues caused by transmit power amplifier.)

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-single-out (MISO) or a multiple-in-multiple-out (MIMO) system.

A MIMO system employs multiple ($N_T$) transmit antennas and multiple ($N_R$) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Additionally, a wireless communication system that supports high data rates specified by advanced radio access technologies (RAT) may face overload issues (e.g., power consumption and overheating issues) in comparison to conventional wireless devices supporting lower data rates. As such, there is a need for techniques and apparatus for mitigating overload issues while supporting high data rates.

SUMMARY

Certain aspects of the present disclosure provide a method for wireless communications. The method generally includes determining whether an overload metric has exceeded a corresponding threshold value. The method further includes modifying a transmit power of at least one uplink control channel during a first time interval if the overload metric has exceeded the corresponding threshold value, by selectively not transmitting at least a portion of the uplink control channel during an off-cycle period of the first time interval.

In certain aspects, an apparatus for wireless communications is provided. The apparatus generally includes means for determining whether an overload metric has exceeded a corresponding threshold value. The apparatus further includes means for modifying a transmit power of at least one uplink control channel during a first time interval if the overload metric has exceeded the corresponding threshold value, by selectively not transmitting at least a portion of the uplink control channel during an off-cycle period of the first time interval.

In certain aspects, an apparatus for wireless communications having at least one processor is provided. The at least one processor is configured to determine whether an overload metric has exceeded a corresponding threshold value. The at least one processor is further configured to modify a transmit power of at least one uplink control channel during a first time interval if the overload metric has exceeded the corresponding threshold value, by selectively not transmitting at least a portion of the uplink control channel during an off-cycle period of the first time interval.

In certain aspects, a computer-program product for wireless communication is provided. The computer-program product generally includes a non-transitory computer-readable medium having code stored thereon, the code being executable by one or more processors. The code generally includes code for determining whether an overload metric has exceeded a corresponding threshold value. The code further includes code for modifying a transmit power of at least one uplink control channel during a first time interval if the overload metric has exceeded the corresponding threshold value, by selectively not transmitting at least a portion of the uplink control channel during an off-cycle period of the first time interval.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
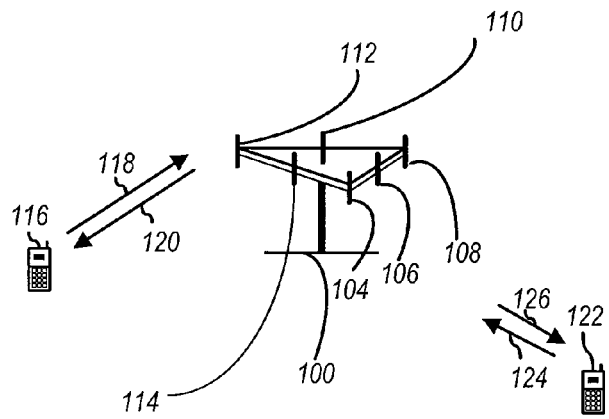
FIG. 1 illustrates a multiple access wireless communication system.

New radio access technologies, such as LTE, enable high data rates (e.g., over 100 Mbps in downlink communications and 50 Mbps in uplink communications), thereby causing greater power consumption in wireless devices when compared to conventional devices at lower data rates. Additionally, as wireless devices move towards smaller form factors, such high data rates may cause extreme heat issues. These reasons motivate the need to carefully monitor device temperatures and ensure that situations do not arise where the device is damaged or a user of the wireless device experiences uncomfortably high touch temperatures. It is noted that, according to certain aspects, the touch temperature of such a wireless device has been predicted to lie between 42° C. and 51° C. with the uplink's limit for a plastic housing set at 50° C.

In some cases, a power amplifier (PA) may be the main source of over-heating stemming from uplink transmission. As such, in such conditions, techniques are provided for reducing transmit power for uplink communications in order to reduce the temperature of the wireless device. According to certain aspects of the present disclosure, when the temperature of one or more components of a wireless device exceeds a certain threshold value, the uplink transmit power (e.g., average uplink transmit power) of the wireless device may be throttled in order to reduce the temperature. Since, in some cases, overheating is due to PA operating at full power, a mechanism is provided for reducing the temperature by controlling the UE transmit power and throttling the uplink channel when the PA is hot.

Other solutions for uplink flow control include reducing the Medium Access Control (MAC) layer data rate using a buffer status report (BSR) mechanism. However, this approach may not be effective in cases where an uplink control channel (e.g., Physical Uplink Control Channel) is being transmitted at a high power and is the dominant factor in overheating.

Accordingly, according to certain aspects, methods and apparatus are provided for uplink flow control by duty cycling of an uplink channel (e.g., control channel) to mitigate thermal issues. According to certain aspects, methods and apparatus are also provided for uplink flow control by reducing a maximum transmit power limit for one or more uplink channels in order to further mitigate thermal issues.

For the purposes of the detailed discussion below, a method for uplink throttling due to thermal issues (e.g., overheating) is discussed, though the certain aspects provided below may be applied to other data throttling scenarios, for example, such as those arising from overload of CPU and/or memory components of the wireless device. Similarly, for the purposes of discussion, the terms "overload metric" and "temperature metric" may be used interchangeably, though it is understood an "overload metric" may comprise at least one of a CPU overload metric, a memory overload metric, a temperature metric, and other suitable feedback and/or performance-related metrics.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access schemes in 3GPP Long Term Evolution (LTE), or Evolved UTRA, and/or LTE Advanced.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an wireless terminal, a user terminal, a user agent, a user device, user equipment ("UE"), a user station, a subscriber station, a subscriber unit, a mobile station, a remote station, a remote terminal, or some other terminology.

In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects described herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) includes multiple antenna groups, one including antennas 104 and 106, another including antennas 108 and 110, and yet another including antennas 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. Each antenna group may be designed to communicate to access terminals in a sector of the areas covered by access point 100. In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
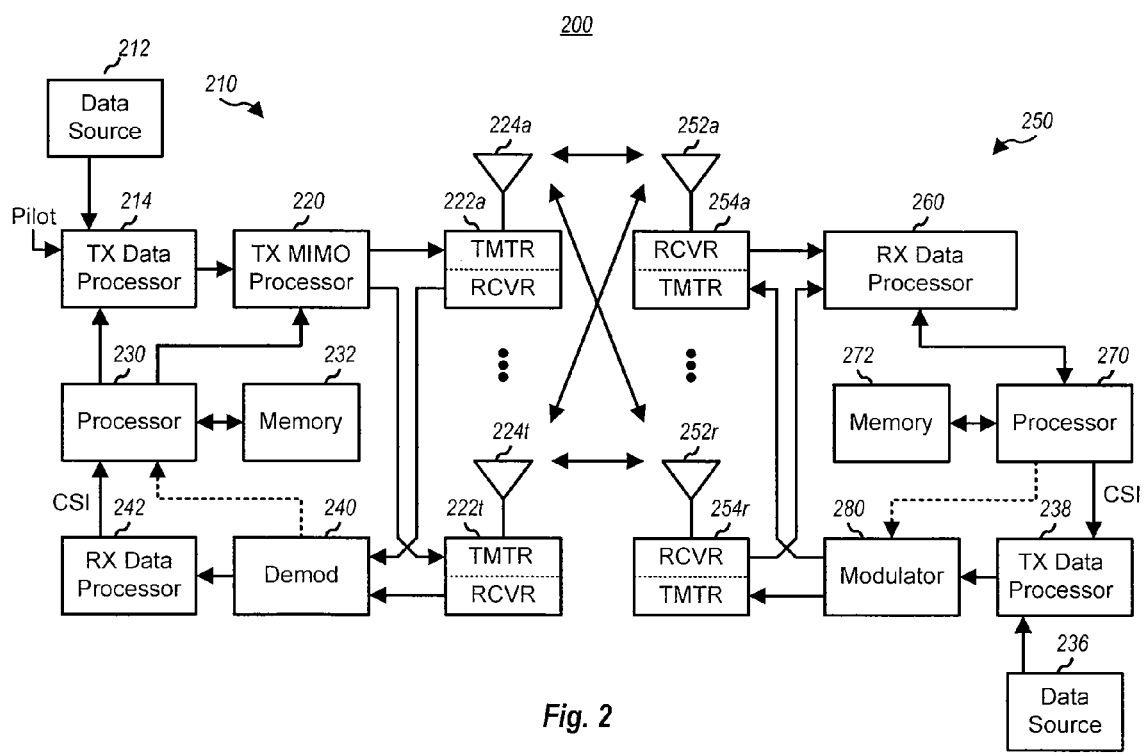
FIG. 2 is a block diagram of a communication system.

FIG. 2 is a block diagram of an aspect of a transmitter system 210 (also known as the access point) and a receiver system 250 (also known as the access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

According to certain aspects, the receiver system 250 may further include a temperature monitor (discussed in detail in FIG. 3) configured to determine and generate a temperature metric. According to certain aspects, the processor 270 of the receiver system 250 may be configured modify a transmit power of the transmitters 254a through 254r based on the temperature metric. The processor 270 may further include one or more timers that assist in periodically modifying the transmit power of the transmitters 254a through 254r. According to certain aspects, the processor 270 may modify uplink control channel transmissions to not transmit one or more acknowledgement messages (e.g., HARQ ACK/NACK) corresponding to messages processed by the RX data processor 260.

It is generally understood that logical channels are classified into Control Channels and Traffic Channels. Logical Control Channels comprise a Broadcast Control Channel (BCCH) which is a DL channel for broadcasting system control information, a Paging Control Channel (PCCH) which is a DL channel that transfers paging information, and a Multicast Control Channel (MCCH) which is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH) which is a point-to-point bi-directional channel, dedicated to one UE, for the transfer of user information. Also, a Multicast Traffic Channel (MTCH) is a point-to-multipoint DL channel for transmitting traffic data.

It is further understood that Transport Channels are classified into DL and UL. DL Transport Channels comprise a Broadcast Channel (BCH), a Downlink Shared Data Channel (DL-SDCH) and a Paging Channel (PCH), the PCH for support of UE power saving (Discontinuous Reception (DRX) cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)
For the purposes of the present document, the following abbreviations apply:
ACK Acknowledgement
AM Acknowledged Mode
AMD Acknowledged Mode Data
ARQ Automatic Repeat Request
BCCH Broadcast Control CHannel
BCH Broadcast CHannel
BW Bandwidth
C-Control-
CB Contention-Based
CCE Control Channel Element
CCCH Common Control CHannel
CCH Control CHannel
CCTrCH Coded Composite Transport Channel
CDM Code Division Multiplexing
CF Contention-Free
CP Cyclic Prefix
CQI Channel Quality Indicator
CRC Cyclic Redundancy Check
CRS Common Reference Signal
CTCH Common Traffic CHannel
DCCH Dedicated Control CHannel
DCH Dedicated CHannel
DCI Downlink Control Information
DL DownLink
DRS Dedicated Reference Signal
DSCH Downlink Shared Channel
DSP Digital Signal Processor
DTCH Dedicated Traffic CHannel
E-CID Enhanced Cell IDentification
EPS Evolved Packet System
FACH Forward link Access CHannel
FDD Frequency Division Duplex
FDM Frequency Division Multiplexing
FSTD Frequency Switched Transmit Diversity
HARQ Hybrid Automatic Repeat/request
HW Hardware
IC Interference Cancellation
L1 Layer 1 (physical layer)
L2 Layer 2 (data link layer)
L3 Layer 3 (network layer)
LI Length Indicator
LLR Log-Likelihood Ratio
LSB Least Significant Bit
MAC Medium Access Control
MBMS Multimedia Broadcast Multicast Service
MCCH MBMS point-to-multipoint Control Channel
MMSE Minimum Mean Squared Error
MRW Move Receiving Window
MSB Most Significant Bit
MSCH MBMS point-to-multipoint Scheduling CHannel
MTCH MBMS point-to-multipoint Traffic CHannel
NACK Non-Acknowledgement
PA Power Amplifier
PBCH Physical Broadcast CHannel
PCCH Paging Control CHannel
PCH Paging CHannel
PCI Physical Cell Identifier
PDCCH Physical Downlink Control CHannel
PDU Protocol Data Unit
PHICH Physical HARQ Indicator CHannel
PHY PHYsical layer
PhyCH Physical CHannels
PMI Precoding Matrix Indicator
PRACH Physical Random Access Channel
PSS Primary Synchronization Signal
PUCCH Physical Uplink Control CHannel
PUSCH Physical Uplink Shared CHannel
QoS Quality of Service
RACH Random Access CHannel
RB Resource Block
RLC Radio Link Control
RRC Radio Resource Control
RE Resource Element
RI Rank Indicator
RNTI Radio Network Temporary Identifier
RS Reference Signal
RTT Round Trip Time Rx Receive
SAP Service Access Point
SDU Service Data Unit
SFBC Space Frequency Block Code
SHCCH SHared channel Control CHannel
SINR Signal-to-Interference-and-Noise Ratio
SN Sequence Number
SR Scheduling Request
SRS Sounding Reference Signal
SSS Secondary Synchronization Signal
SU-MIMO Single User Multiple Input Multiple Output
SUFI SUper Field
SW Software
TA Timing Advance
TCH Traffic CHannel
TDD Time Division Duplex
TDM Time Division Multiplexing
TFI Transport Format Indicator
TPC Transmit Power Control
TTI Transmission Time Interval
Tx Transmit
U-User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
VOIP Voice Over Internet Protocol
MBSFN Multicast Broadcast Single Frequency Network
MCH Multicast Channel
DL-SCH Downlink Shared Channel
PDCCH Physical Downlink Control Channel
PDSCH Physical Downlink Shared Channel Thermal Mitigation Using Uplink Transmit Power Backoff As described above, a user equipment (UE) supporting high data rates specified by advanced wireless technologies, such as LTE, may have overheating issues due to one or more components (e.g., power amplifier) operating at full power. According to certain aspects, methods and techniques are provided for an uplink transmit power back-off in order to mitigate thermal issues.

According to certain aspects, a transmit power may be reduced for all uplink channels, including but not limited to uplink control channels (e.g., Physical Uplink Control Channel (PUCCH)), uplink data channels (e.g., Physical Uplink Shared Channel (PUSCH)), and reference signals (e.g., Sounding Reference Signal (SRS)) by applying a back-off value to a maximum transmit power limit (MTPL) of the uplink transmissions. According to certain aspects, a transmit power may be reduced for uplink control channels (e.g., PUCCH) by applying the power back-off to the uplink control channel only, or, in one implementation, by applying a duty cycle for PUCCH transmissions.

Figure 3:
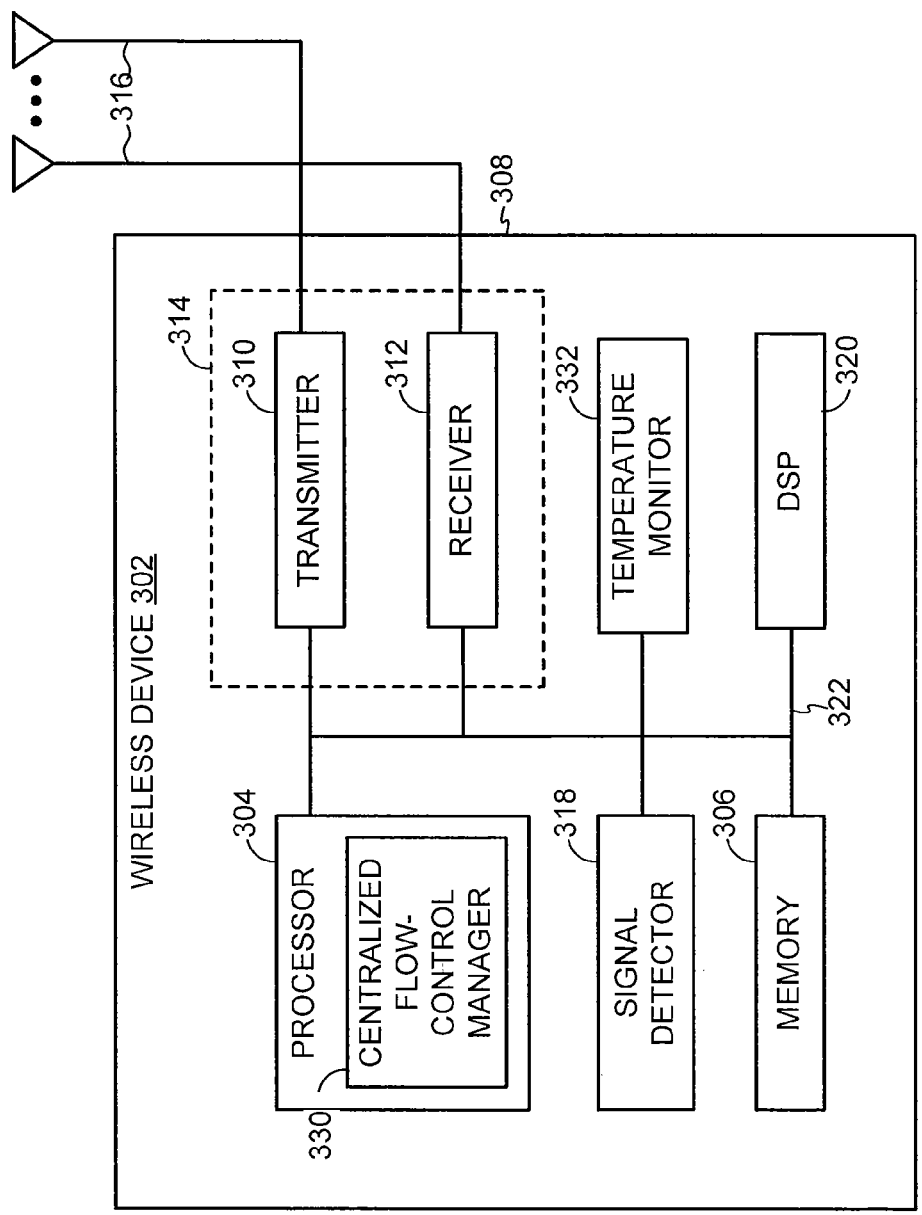
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein for uplink flow control to mitigate thermal issues. While the wireless device 302 may be any of user terminals 116 and 122 of FIG. 1 or the receiver system 250 of FIG. 2, the below detailed description may interchangeably refer to the wireless device 302 as a UE 302.

The wireless device 302 may include a processor 304 which controls operation of the wireless device 302. The processor 304 may also be referred to as a central processing unit (CPU). The various components of the wireless device 302 may be coupled together by a bus system 322, which may include a power bus, a control signal bus, and a status signal bus in addition to a data bus. Memory 306, which may include both read-only memory (ROM) and random access memory (RAM), provides instructions and data to the processor 304. A portion of the memory 306 may also include non-volatile random access memory (NVRAM). However, additional and/or other memories may be employed. The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and/or multiple transceivers.

The wireless device 302 may also include a signal detector 318 that may be used in an effort to detect and/or quantify the level of signals received by the transceiver 314. The signal detector 318 may detect such signals as total energy, energy per subcarrier per symbol, power spectral density and/or other signals. The wireless device 302 may also include a digital signal processor (DSP) 320 for use in processing signals.

According to certain aspects, the processor 304 may include a centralized flow-control manager (CFM) 330 configured to receive one or more signals from a temperature monitor 332. The temperature monitor 332 is configured to measure the temperatures of one or more components of the wireless device 302 (e.g., a power amplifier, not shown). According to certain aspects, the temperature monitor may provide a corresponding temperature metric signal to the CFM 330 for executing uplink flow control techniques described herein. The CFM 330 instructs a RAT-specific flow control entity with a flow control signal (e.g., UP, DOWN), responsive to receiving the temperature metric signal (e.g., "Normal", "Mitigation"). For example, according to certain aspects, the CFM 330 may modify a transmit power of the transceiver 314 (e.g., LTE Layer 1 components) for uplink transmission based on the temperature metric signal. In one implementation, the CFM 330 may reduce an uplink channel transmit power of one or more components of the transceiver 314 (e.g., a power amplifier) prior to transmission by the transmit antennas 316.

While the monitor is shown as a temperature monitor 332 in FIG. 3, it is contemplated that certain aspects of the present disclosure may utilize other suitable monitors, including but not limited to a CPU monitor and a memory monitor, having one or more corresponding sensor components for detecting one or more overload metrics.

According to certain aspects, while the temperature monitor 332 is depicted as a single component in FIG. 3, it is contemplated that the temperature monitor 332 may include a plurality of sensor components, each sensor component coupled to (e.g., thermally coupled to) a corresponding component of the wireless device 302. According to certain aspects, the temperature monitor 332 may include different temperature "sub-systems," as defined in Table 1. As such, the temperature monitor 332 may be configured to measure the temperature of a plurality of components within the UE and/or a plurality of regions of the UE 302. According to certain aspects, the temperature monitor 332 includes a sensor that measures the temperature of a power amplifier of the UE.

TABLE 1

Temperature Sensor Sub-systems

| Sensor Subsystem | Number of Sensors |
| --- | --- |
| Analog-to-Digital Convertor (ADC) Power Amplifier (PA) Thermal Region (° C.) | 1 |
| ADC Mobile Station Modem (MSM) Thermal Region (° C.) | 1 |
| ADC Battery Thermal Region (° C.) | 1 |
| Internal Die Sensor(s) | 5 |

Figure 4:
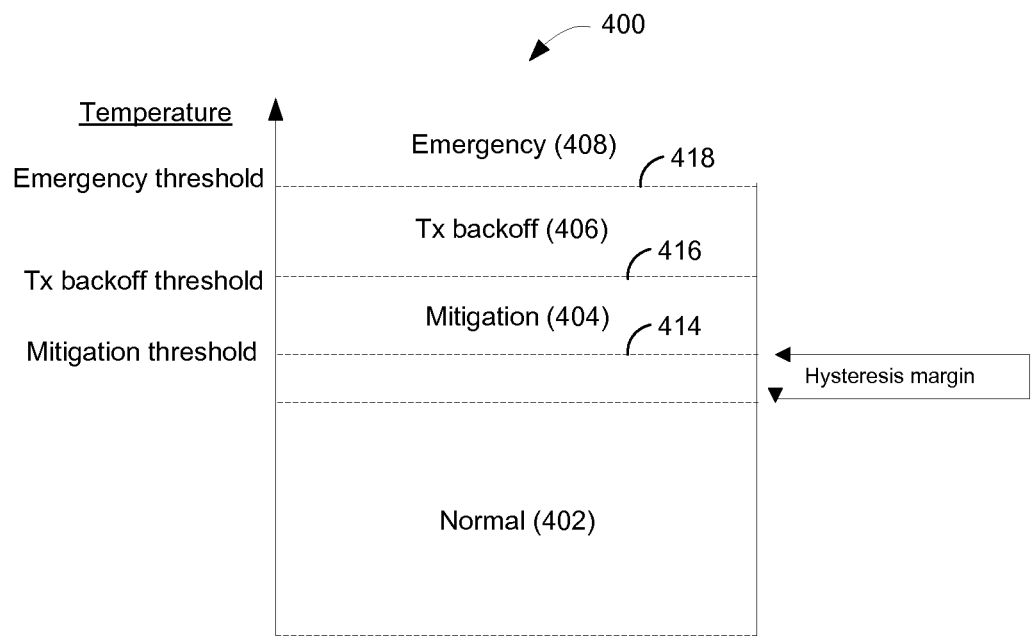
FIG. 4 is a graph illustrating various temperatures and corresponding states of the temperature monitor of FIG. 3 according to certain aspects of the present disclosure.

FIG. 4 is a graph illustrating various temperatures and corresponding states of the temperature monitor 332 according to certain aspects of the present disclosure. According to certain aspects, the temperature monitor 332 may be configured to utilize a plurality of monitor states, wherein the temperature monitor 332 changes state based on the reading from one or more of the above-described temperature sensors.

According to certain aspects, the temperature monitor 332 may be in one of the following four states: a Normal state 402, a Mitigation state 404, a Transmit (TX) Back-off state 406, and an Emergency state 408. As shown in FIG. 4, the regions of these four states may be controlled by corresponding threshold values (e.g., Mitigation threshold 414, TX back-off threshold 416, and Emergency threshold 418). According to certain aspects, the threshold values may be pre-determined or may be configurable during operation of the UE 302. According to certain aspects, a hysteresis value may be utilized in combination with any of the threshold values 414, 416, 418 to smoothly transition between any of the monitor states.

According to certain aspects, the temperature monitor 332 may send an indication to the CFM upon every state change to notify the CFM of the new state and upon registration to notify the CFM of the current state. According to certain aspects, when the temperature monitor 332 is in the mitigation state 404, one or more uplink flow control techniques and other known methods may be utilized to reduce the temperature of the UE 302. According to certain aspects, when the temperature monitor 332 determines a temperature that exceeds the TX back-off threshold 416, the temperature monitor may send an indication to the CFM 330 to reduce transmit power of the UE 302 by a configurable amount.

Figure 5:
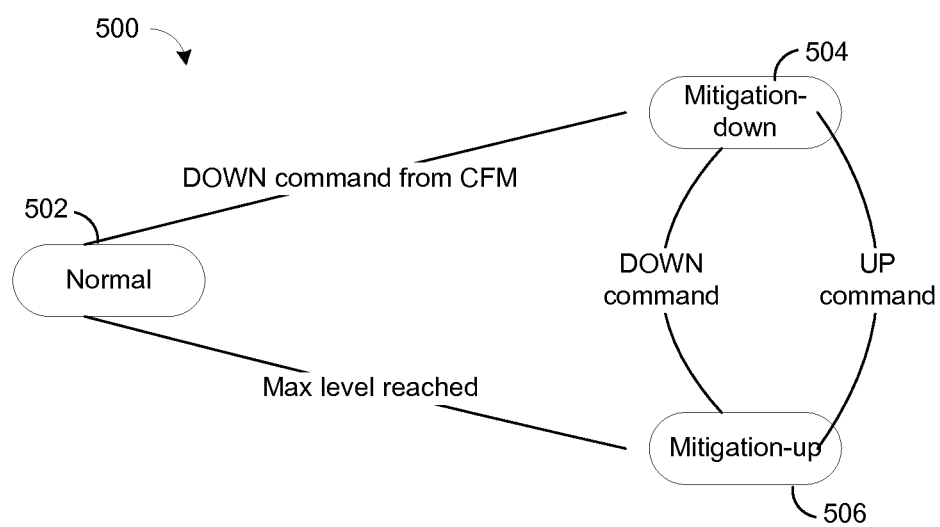
FIG. 5 illustrates a state transition diagram for exemplary operations that may be performed by a wireless device in accordance with certain aspects of the present disclosure.

FIG. 5 illustrates a state transition diagram 500 for example operations that may be performed by a wireless device in accordance with certain aspects of the present disclosure. The state transition diagram 500 represents one particular implementation of the techniques described herein, and it is contemplated that other implementations may be produced to execute the methods and procedures provided herein.

According to certain aspects, the CFM 330 may be configured to control and manage flow control activities utilizing a plurality of states 500 depicted in FIG. 5. In other words, the CFM 330 decides whether a flow control technique may be applied in each various state of the CFM 330, and if so, which technique. Additionally, according to certain aspects, the CFM 330 may maintain the state of the temperature monitor 332 as described above and make decisions regarding uplink flow control accordingly. The behavior of the CFM in each state is described below.

Generally, according to certain aspects, when the CFM 330 receives an indication from the temperature monitor 332 that the monitor 332 has transitioned from a normal state 402 to a mitigation state 404 and/or a TX back-off state 406, the CFM 330 may transmit a command (e.g., DOWN) to one or more components (e.g., the power amplifier). According to certain aspects, when the CFM 330 receives an indication that the temperature monitor 332 has transitioned from a Mitigation state 404 and/or a TX back-off state 406 to a normal state 402 the CFM 330 may transmit a command (e.g., UP) to one or more components (e.g., the power amplifier).

As shown in FIG. 5, the CFM 330 may begin operation in a default state, or a Normal state 502, wherein no uplink flow control may be required. According to certain aspects, if the CFM 330 determines the temperature monitor is in a mitigation state 404, the CFM issues a DOWN command and transitions to the Mitigation-Down state 504. It is noted that the term "DOWN" is generally used herein to describe periods of time corresponding to reduced and/or backed off transmit power and/or data rates, while "UP" is generally used to describe periods of restored, full, and/or increased transmit power and/or date rate.

According to certain aspects, the CFM 330 is configured to implement a transmit power back-off technique according to certain aspects of the present disclosure. According to certain aspects, a technique may be utilized to reduce a transmit power for all uplink channels (e.g., PUCCH, PUSCH, SRS, etc.) by applying a back-off value to a maximum transmit power limit (MTPL) for one or more transceiver components (e.g., for the power amplifier). According to certain aspects, a technique may be utilized to apply a back-off value to an uplink control channel (e.g., PUCCH) only, or, in one implementation, to duty-cycle PUCCH transmissions.

According to certain aspects, the CFM may issue commands (e.g., DOWN and/or UP commands) to manage and/or modify the uplink flow control process. According to certain aspects, the CFM may issue DOWN and/or UP commands to further throttle the uplink control process by modifying one or more back-off values. As shown, the CFM may periodically cycle between the Mitigation-down 504 and Mitigation-up 506 states to reduce the overall transmit power of the wireless device thereby mitigating thermal overheating issues. As shown, the CFM may be configured to determine when a maximum level has been reached and return to the Normal State 502.

Figure 6:
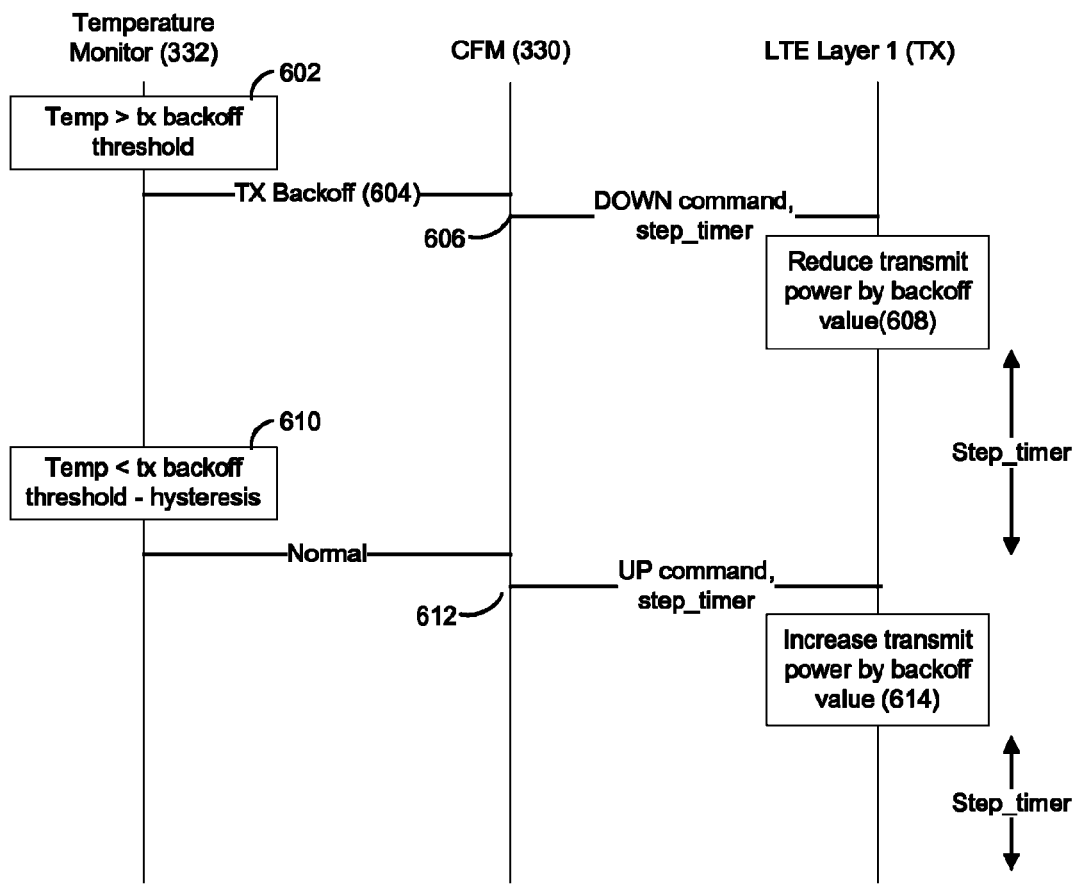
FIG. 6 is an example flow control that may be implemented by a wireless device for transmit power control in accordance with certain aspects of the present disclosure.

FIG. 6 is an example flow control that may be implemented by a wireless device for transmit power control in accordance with certain aspects of the present disclosure. As described above, at 602, the temperature monitor determines that a temperature measured by one or more sensors exceeds a transmit back-off threshold value, transitions to a transmit back-off state, and, at 604, notifies the CFM of the change in state to the transmit back-off state.

As shown, at 606, the CFM receives the indication that the temperature monitor 332 has transitioned to a transmit back-off state, and provide a DOWN command to one or more radio components (e.g., LTE Layer 1 components) and begins a step timer. As shown, at 608, responsive to receiving the DOWN command, the one or more radio components may reduce a maximum transmit power limit by a configurable back-off value. According to certain aspects, other suitable transmit power values, including the MTPL, may be utilized to provide uplink flow control. According to one implementation, upon expiry of the step timer, the MTPL may be restored to a previous value (e.g., full power). According to another implementation, the MTPL may remain at a reduced value until further modified via commands from the CFM.

As shown, at 610, the temperature monitor determines the temperature measured by the one or more sensors may no longer exceed a transmit back-off threshold value, transitions to a normal state, and at 612, notifies the CFM of the change in state. As shown, at 612, the CFM receives the indication that the temperature monitor has transitioned to a normal state, and as such, uplink flow control may no longer be needed. The CFM provides the one or more radio components (e.g., LTE Layer 1) with an UP command. At 614, responsive to receiving an UP command, the one or more radio components (e.g., LTE Layer 1) may increase the MTPL by the back-off value discussed above.

Figure 7:
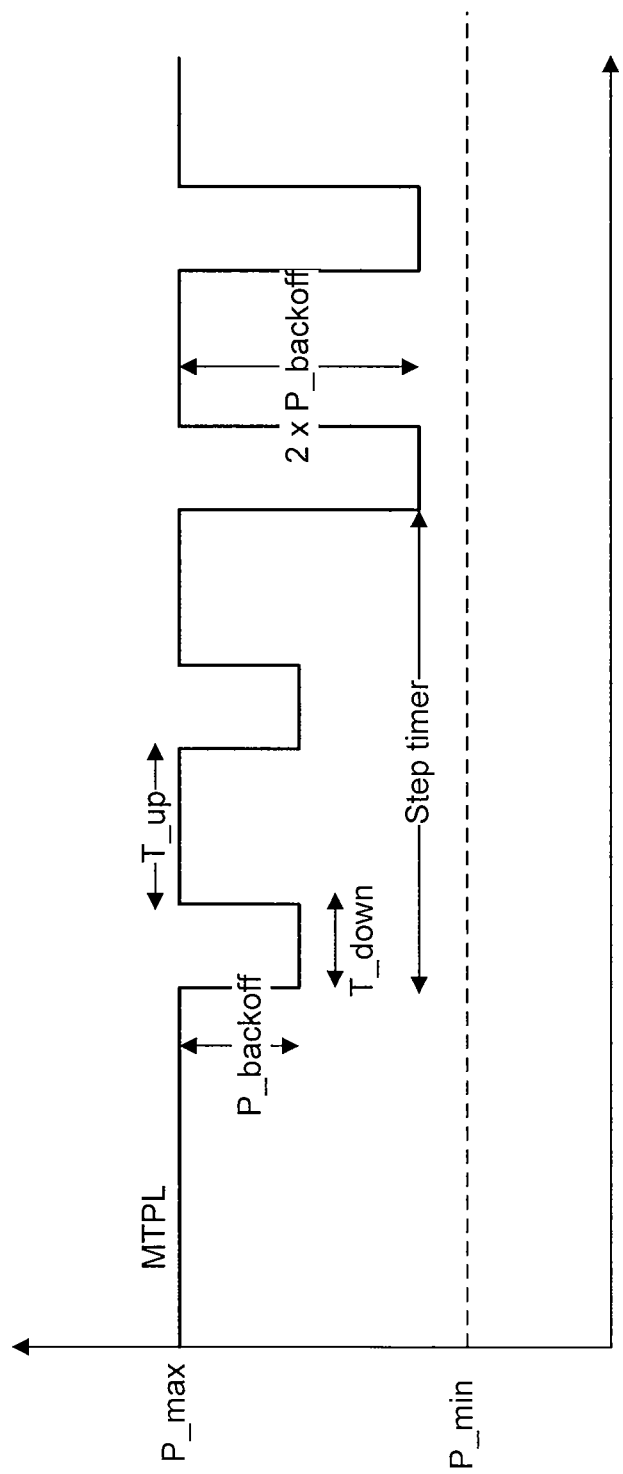
FIG. 7 is a graph illustrating transmit power control as a function of time utilizing techniques in accordance with certain aspects of the present disclosure.

FIG. 7 is a graph illustrating transmit power control as a function of time utilizing techniques in accordance with certain aspects of the present disclosure. As shown, when the transmit power back-off flow control is activated (e.g., a DOWN command is received from CFM), a maximum transmit power limit (MTPL) is reduced by a back-off value (e.g., P_backoff) which may be configurable. In the example shown, the transmit power may be reduced periodically based on T_up and T_down timers. In other words, the transmit power may be reduced for a duration of time represented by a T_down timer. Upon expiry of the T_down timer, the MTPL may be restored to its previous value (e.g., P_max, as shown).

If the temperature monitor remains in a transmit back-off state after expiry of a step timer, the back-off value (e.g., P_backoff) may be increased to further mitigate thermal overheating issues of the UE. In the example shown, the back-off value may be increased by a multiplicative factor (e.g., ×2). As shown, the MTPL may be reduced periodically by 2×P_backoff value. According to certain aspects, the multiplicative factor may increase each time the step_timer expires. According to certain aspects, the back-off value (e.g., P_backoff) may be increased in an incremental, stepwise fashion by a pre-determined step value each time the step_timer expires. According to certain aspects, a configurable minimum transmit power value (e.g., P_min) may be utilized to ensure the MTPL is not reduced below a minimum value.

For the purpose of the detailed discussion, the transmit power being modified is the maximum transmit power limit, however it is contemplated that other suitable transmit power settings may be modified according to techniques discussed herein.

Figure 7A:
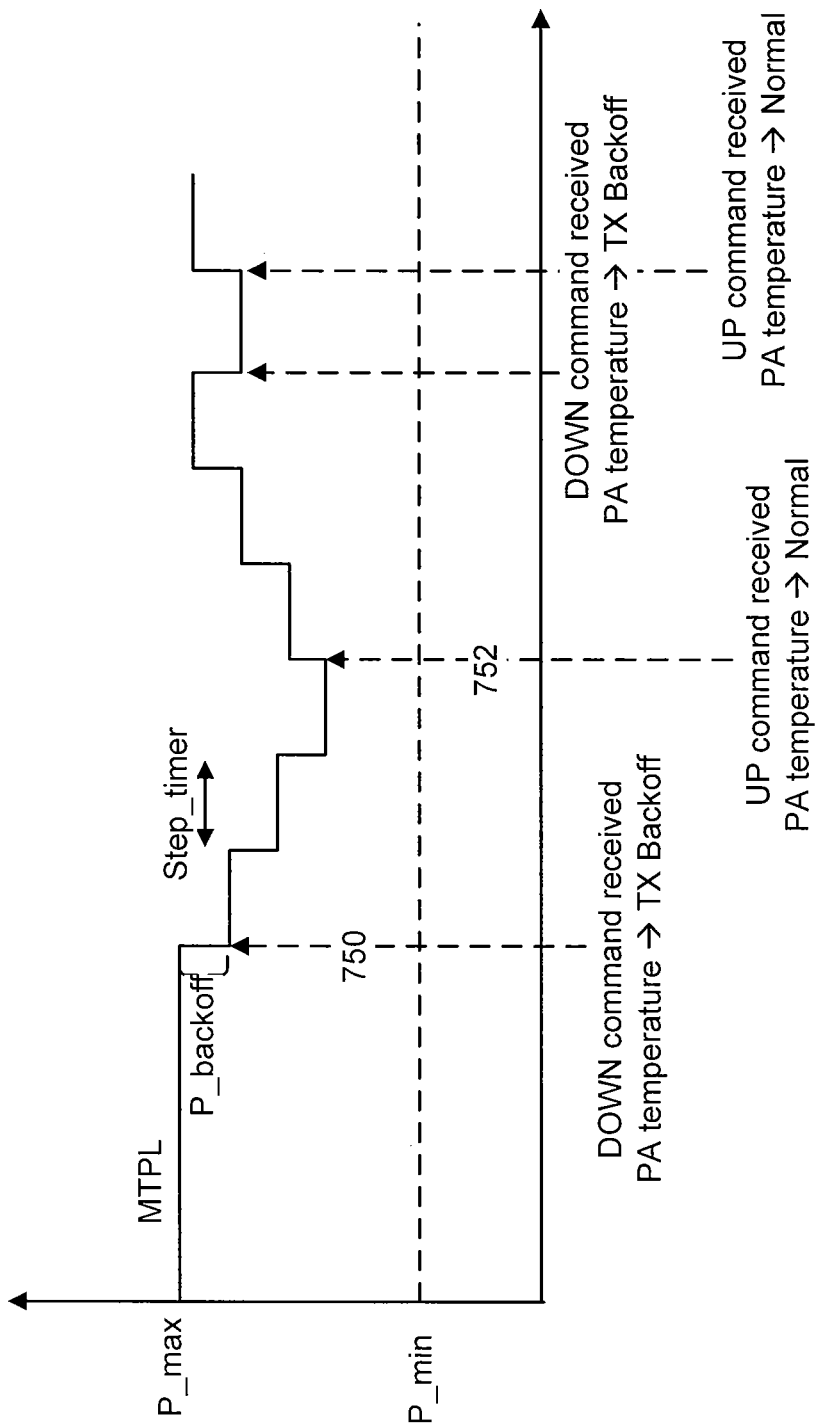
FIG. 7A is another graph illustrating transmit power control as a function of time utilizing an alternative technique in accordance with certain aspects of the present disclosure.

FIG. 7A is another graph illustrating transmit power control as a function of time utilizing an alternative technique in accordance with certain aspects of the present disclosure. As shown, as with the technique described in FIG. 7, when the transmit power back-off flow control is activated (e.g., a DOWN command is received from CFM), at 750, a maximum transmit power limit (MTPL) may be reduced by a back-off value (e.g., P_backoff) which may be configurable. However, in the example shown in FIG. 7A, after expiry of the step timer, the MTPL may remain at a reduced value, rather than be restored to full power.

In the example shown, the MTPL may be further reduced in an incremental fashion upon expiration of each step timer, until an indication is received from the temperature monitor that the PA temperature has been sufficiently reduced to transition the temperature monitor to a normal state. As shown, at 752, an UP command may be received from the CFM that indicates the PA temperature has transitioned to a normal state. As shown, the MTPL may be incrementally increased upon expiration of each step timer until at least another DOWN command is received, or full power (e.g., P_max) is restored.

Figure 8:
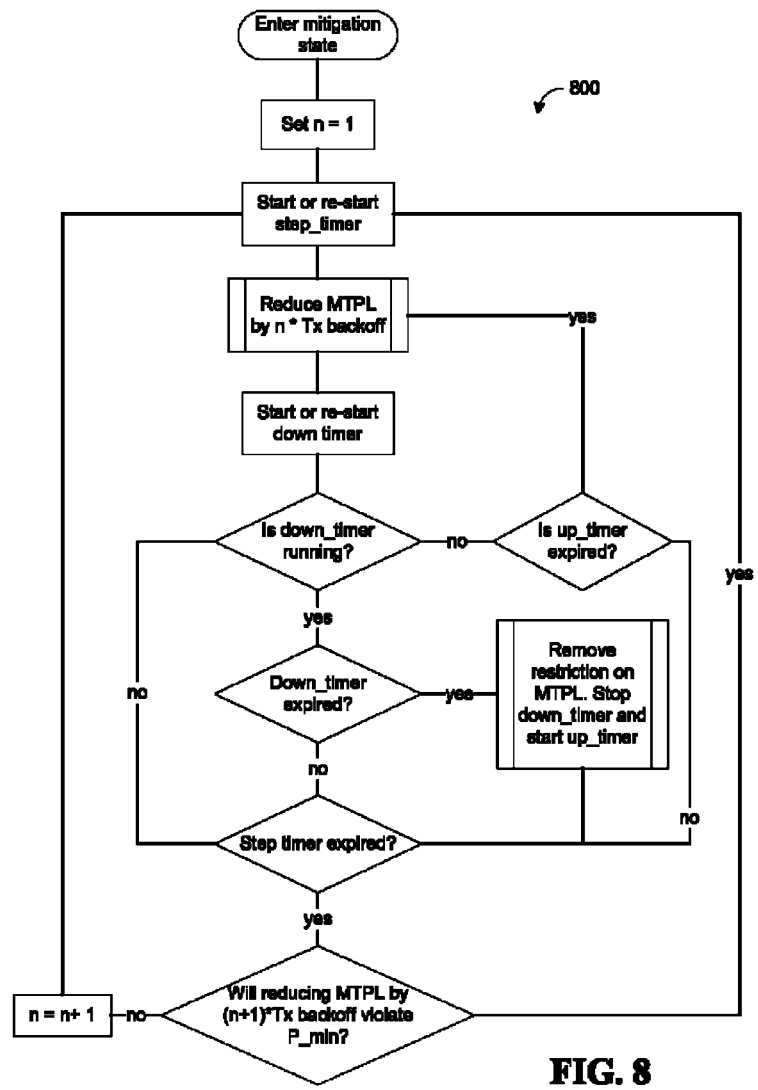
FIG. 8 illustrates example operations for reducing a maximum transmit power limit for uplink flow control in accordance with certain aspects of the present disclosure.

FIG. 8 illustrates example operations for reducing a maximum transmit power limit for uplink flow control in accordance with certain aspects of the present disclosure. FIG. 8 illustrates one example algorithm 800 that may be implemented by the CFM 330 when, for example, the CFM 330 is in the Mitigation-Down state, described above. As shown in FIG. 8, upon entering the Mitigation state, the CFM may initialize an iteration counter (e.g., n) to 1. The CFM may then start a step timer. The step timer comprises a configurable period of time that may be modified for more granular control of the flow control process.

As shown, the CFM may reduce the MTPL by a back-off value (e.g., TX back-off) multiplied by the iteration counter (e.g., n). The CFM may start a down timer that indicates a down period of time during which the MTPL has a reduced value. The CFM may loop until it has been determined the down timer has expired, at which point the CFM may remove the restriction on the MTPL (e.g., restore the reduced value to its prior value), stop the down timer, and start an up timer. According to certain aspects, the up timer indicates an up period of time during which the MTPL is unaffected by the uplink flow control process. The CFM then loops until it has been determined that the up timer has expired, at which point the CFM reduces the MTPL by the back-off value determined above. Accordingly, the CFM continues to periodically reduce and restore the MTPL during down and up periods, respectively, until expiration of the step timer.

As shown, the CFM may determine whether further reducing the MTPL by an additional multiplicative factor (e.g., n+1) would violate a minimum power transit limit (e.g., P_min) If the CFM determines a further reduction would exceed the minimum power, the CFM may not further modify the back-off value and may loop to re-start the step timer and continue to reduce and restore the MTPL by the present transmit back-off value. If the CFM determines a further reduction would not exceed the minimum power, the CFM may increment the iteration counter (e.g., n=n+1) and loop to restart the step timer and reduce the MTPL by the increased transmit back-off value.

According to certain aspects, reducing the MTPL will result in all uplink channels being transmitted at a lower power level. It has been determined that since other known uplink flow control approaches may control a high uplink data channel (i.e., PUSCH) power, one main use case for using a transmit power back-off as described herein is to protect the wireless device against a high uplink control channel (e.g., PUCCH) power. Typically, an uplink control channel (e.g., PUCCH) may be transmitted at a much lower power level than an uplink data channel (e.g., PUSCH.)

For example, consider a scenario where a UE is located near a cell edge and is receiving downlink data in every transmit time interval (TTI), such that the UE will have to transmit acknowledgements messages (e.g., HARQ ACK/NACK) for the received downlink data back using the uplink control channel (e.g., PUCCH.) Furthermore, assume the uplink data channel (e.g., PUSCH) power is set at 23 dBm and the uplink control channel (e.g., PUCCH) power is set at 10 dBm. Accordingly, in order to utilize a transmit power back-off process described above to reduce the uplink control channel (e.g., PUCCH) power by a particular value, say, 3 dB, from 10 dB to 7 dB, the CFM would have to reduce the MTPL to a value (e.g., 7 dB) that would result in decreasing the uplink data channel (e.g., PUSCH) power by 16 dB. Such a significant decrease in uplink data channel may result in a call drop or other data loss.

In order to avoid sacrificing the uplink data channel (e.g., PUSCH), another approach may be utilized to duty cycle the uplink control channel (e.g. PUCCH). In this case, one or more acknowledgment messages for downlink data (e.g., HARQ ACK/NACKs) on the uplink control channel (e.g., PUCCH) will not be transmitted during certain intervals. The UE may be able to send the acknowledgment messages (e.g., ACK) during "on periods". This approach may trigger HARQ re-transmissions. If the total number of HARQ re-transmissions is exhausted, and a base station does not receive any ACK/NACK, the base station may move to the next data packet. The UE however, can pass the received data packet to the higher layers, thereby triggering an acknowledgment (e.g., a radio link control acknowledgment) in the higher layers, in order to prevent unnecessary re-transmissions.

Figure 9:
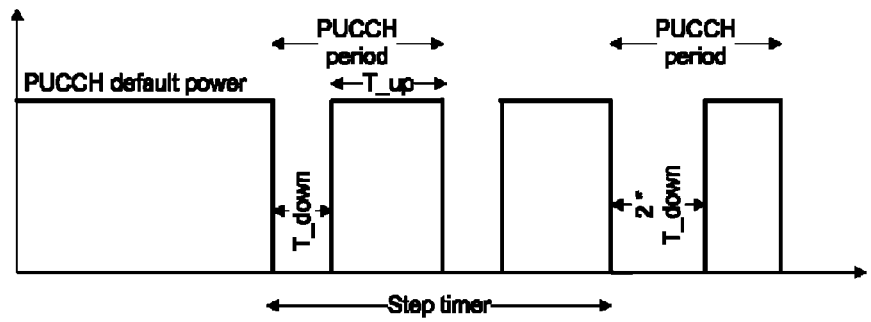
FIG. 9 is a graph illustrating transmit power control of an uplink control channel as a function of time utilizing techniques in accordance with certain aspects of the present disclosure.

FIG. 9 is a graph illustrating transmit power control of an uplink control channel as a function of time utilizing techniques in accordance with certain aspects of the present disclosure. A sample path of an algorithm implementing duty cycling of PUCCH is shown in FIG. 9. According to certain aspects, the basic process may be similar to the MTPL algorithm described above, with the difference of rather than changing the back-off power value, the UE may increase the duration of the "off period" whenever step timer expires.

As shown, at the initial state, the UE may transmit one or more of the uplink channels (e.g., both data and control) at full power (e.g., PUCCH default power). During the period of time designated for transmitting the uplink control channel (e.g., PUCCH), the CFM may start a down timer (e.g., illustrated as T_down in FIG. 9) indicating a down period of time during which a portion of the uplink control channel (e.g., PUCCH) may not be transmitted (e.g., duty cycling PUCCH). According to certain aspects, during the down timer, the UE may not transmit any acknowledgment messages (e.g., HARQ ACK/NACK) for received downlink data on PUCCH. According to certain aspects, the UE may continue to transmit other types of messages of the PUCCH, including, but not limited to, Channel Quality Indicator (CQI) reports.

Upon expiration of the down timer, the CFM may increase transmit power to full power and start an up timer (e.g., illustrated as T_up in FIG. 9) representing an up period of time during which PUCCH may be transmitted. According to certain aspects, upon expiration of the down timer, the UE may resume transmitting PUCCH during the time interval normally designated for transmitting PUCCH (e.g., PUCCH period). Accordingly, the duty cycling of PUCCH approach reduces the average transmit power for PUCCH over the duration of the step timer, thereby mitigating thermal issues related to the uplink channel.

According to certain aspects, the down timer and up timer may be modified to reduce the average transmit power for PUCCH while allowing the sum of their durations (e.g., T_down +T_up) to be kept constant and equaling a period of time designated for uplink control channel (e.g., PUCCH period). In some aspects, the sum of T_down may equal T_up over a period of time. According to certain aspects, the PUCCH duty cycle can be adjusted by changing the durations of the down timer (e.g., T_down) and the up timer (e.g., T_up.) As described above, upon expiration of the step timer, the CFM may determine that the temperature of the UE still exceeds a threshold value and may require further mitigation. As such, the CFM may issue an additional command (e.g., DOWN command) to increase the duration of the down timer. In the example shown, the down timer is increased by a multiplicative power (e.g., ×2).

Figure 10:
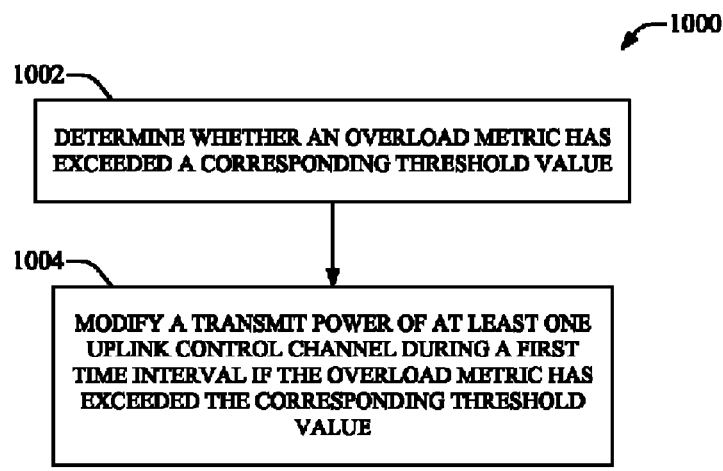
FIG. 10 illustrates an example operation for uplink flow control that may be performed by a wireless device in accordance with certain aspects of the present disclosure.

FIG. 10 illustrates an example operation 1000 for uplink flow control that may be performed by a user equipment (UE) in accordance with certain aspects of the present disclosure. The operation 1000 may begin at 1002 where the UE may determine whether an overload metric has exceeded a corresponding threshold value. According to certain aspects, the overload metric is a temperature metric corresponding to temperature sensor measurements of one or more components of the UE.

At 1004, the UE may modify a transmit power of at least one uplink channel during a first time interval if the overload metric has exceeded the corresponding threshold value. According to certain aspects, the UE may adjust an average transmit power of the at least one uplink channel during the first time interval. In one implementation, the at least one uplink channel comprises at least one of a physical uplink shared channel (PUSCH) or a physical uplink control channel (PUCCH).

According to certain aspects, the UE may modify the transmit power of at least one uplink control channel during a first time interval by selectively not transmitting at least a portion of the uplink control channel during an off-cycle period of the first time interval. In certain aspects, the portion of the uplink control channel selectively not transmitted may be one or more acknowledgment messages corresponding to one or more received packets. According to certain aspects, the UE may selectively not transmit one or more HARQ messages of PUCCH during the first time interval for a duration of the off-cycle period. According to certain aspects, the UE may transmit the at least one uplink control channel during the first time interval upon expiration of the off-cycle period.

According to certain aspects, the UE may determine, after expiration of the first time interval, whether the overload metric still exceeds the threshold value. The UE may modify a duration of the off-cycle period based at least in part on the overload metric, and selectively not transmit one or more acknowledgment messages during a second time interval for a duration of the modified off-cycle period. According to certain aspects, the UE may transmit one or more radio link control acknowledgement messages corresponding to the one or more packets on an uplink data channel during the first time interval for the duration of the off-cycle period.

According to certain aspects, the UE may reduce a MTPL of a PA associated with at least one uplink channel during the first time interval. The UE may modify the MTPL by reducing the MTPL based on a configurable power back-off value. According to certain aspects, the UE may modify the power back-off value and then further modify the MTPL during a second time interval based on the modified power back-off value. According to certain aspects, the UE may periodically reduce the MTPL for the at least one uplink channel based on a power back-off value during one or more down timer periods during the first time interval. According to certain aspects, the UE may periodically restore the transmit power limit during one or more up timer periods during the first time interval.

According to certain aspects, the UE may determine after expiration of the first time interval, whether the overload metric still exceeds the corresponding threshold value. The UE may increase the power back-off value by a pre-determined multiplicative factor and reduce the MTPL based on the increased power back-off value.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting and means for not-transmitting may comprise a transmitter, such as the transmitter unit 254 of the receiver system 250 (e.g., the wireless terminal) shown in FIG. 2, or means for determining, means for modifying, means for increasing, means for reducing, means for restoring, and/or means for adjusting may comprise a processing system, which may include one or more processors, such as the processor 270 of the receiver system 250 illustrated in FIG. 2. These means may also comprise any suitable combination of the transmitters 310, the processor 304 including the centralized flow-control manager 330, and/or the temperature monitor 332 of FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, comprising:
determining whether an overload metric has exceeded a corresponding threshold value;
modifying a transmit power of at least one uplink control channel during a first time interval if the overload metric has exceeded the corresponding threshold value, by selectively not transmitting at least a portion of the uplink control channel during an off-cycle period of the first time interval;
determining, after expiration of the first time interval, whether the overload metric still exceeds the threshold value;
modifying a duration of the off-cycle period based at least in part on the overload metric; and
selectively not transmitting at least a portion of the uplink control channel during a second time interval for a duration of the modified off-cycle period.

2. The method of claim 1, wherein the overload metric is a temperature metric.

3. The method of claim 1, wherein the portion of the uplink control channel selectively not transmitted comprises one or more acknowledgment messages corresponding to one or more received packets.

4. The method of claim 1, wherein the step of modifying the transmit power further comprises:
selectively not transmitting one or more hybrid automatic repeat request (HARQ) messages of a physical uplink control channel (PUCCH) during the first time interval for a duration of the off-cycle period.

5. The method of claim 1, further comprising:
transmitting the at least one uplink control channel during the first time interval upon expiration of the off-cycle period.

6. The method of claim 1, further comprising:
upon expiration of the first time interval, increasing the duration of the off-cycle period responsive to determining the overload metric still exceeds the threshold value.

7. The method of claim 1, wherein:
selectively not transmitting at least a portion of the uplink control channel during a second time interval for a duration of the modified off-cycle period includes selectively not transmitting one or more acknowledgment messages during the second time interval for the duration of the modified off-cycle period.

8. The method of claim 1, further comprising:
transmitting one or more radio link control acknowledgement messages corresponding to one or more packets on an uplink data channel during the first time interval for the duration of the off-cycle period.

9. The method of claim 1, wherein the step of modifying the transmit power further comprises:
reducing a maximum transmit power limit (MTPL) of a power amplifier (PA) associated with at least one uplink channel during the first time interval.

10. The method of claim 9, wherein the step of modifying comprises:
periodically reducing the MTPL for the at least one uplink channel based on a power back-off value during one or more down timer periods during the first time interval.

11. An apparatus for wireless communications, comprising:
means for determining whether an overload metric has exceeded a corresponding threshold value;
means for modifying a transmit power of at least one uplink control channel during a first time interval if the overload metric has exceeded the corresponding threshold value, by selectively not transmitting at least a portion of the uplink control channel during an off-cycle period of the first time interval;
means for determining, after expiration of the first time interval, whether the overload metric still exceeds the threshold value;
means for modifying a duration of the off-cycle period based at least in part on the overload metric; and
means for selectively not transmitting at least a portion of the uplink control channel during a second time interval for a duration of the modified off-cycle period.

12. The apparatus of claim 11, wherein the overload metric is a temperature metric.

13. The apparatus of claim 11, wherein the portion of the uplink control channel selectively not transmitted comprises one or more acknowledgment messages corresponding to one or more received packets.

14. The apparatus of claim 11, wherein the means for modifying the transmit power further comprises:
means for selectively not transmitting one or more hybrid automatic repeat request (HARQ) messages of a physical uplink control channel (PUCCH) during the first time interval for a duration of the off-cycle period.

15. The apparatus of claim 11, further comprising:
means for transmitting the at least one uplink control channel during the first time interval upon expiration of the off-cycle period.

16. The apparatus of claim 11, further comprising:
means for, upon expiration of the first time interval, increasing the duration of the off-cycle period responsive to determining the overload metric still exceeds the threshold value.

17. The apparatus of claim 11, wherein:
means for selectively not transmitting at least a portion of the uplink control channel during a second time interval for a duration of the modified off-cycle period includes means for selectively not transmitting one or more acknowledgment messages during the second time interval for the duration of the modified off-cycle period.

18. The apparatus of claim 11, further comprising:
means for transmitting one or more radio link control acknowledgement messages corresponding to one or more packets on an uplink data channel during the first time interval for the duration of the off-cycle period.

19. The apparatus of claim 11, wherein the means for modifying the transmit power further comprises:
means for reducing a maximum transmit power limit (MTPL) of a power amplifier (PA) associated with at least one uplink channel during the first time interval.

20. The apparatus of claim 19, wherein the means for modifying comprises:
means for periodically reducing the MTPL for the at least one uplink channel based on a power back-off value during one or more down timer periods during the first time interval.

21. An apparatus for wireless communications, comprising:
at least one processor configured to:
determine whether an overload metric has exceeded a corresponding threshold value;
modify a transmit power of at least one uplink control channel during a first time interval if the overload metric has exceeded the corresponding threshold value, by selectively not transmitting at least a portion of the uplink control channel during an off-cycle period of the first time interval;
determine, after expiration of the first time interval, whether the overload metric still exceeds the threshold value;
modify a duration of the off-cycle period based at least in part on the overload metric; and
selectively not transmit at least a portion of the uplink control channel during a second time interval for a duration of the modified off-cycle period.

22. The apparatus of claim 21, wherein the overload metric is a temperature metric.

23. The apparatus of claim 21, wherein the portion of the uplink control channel selectively not transmitted comprises one or more acknowledgment messages corresponding to one or more received packets.

24. The apparatus of claim 21, wherein the at least one processor configured to modify the transmit power is further configured to:
selectively not transmit one or more hybrid automatic repeat request (HARQ) messages of a physical uplink control channel (PUCCH) during the first time interval for a duration of the off-cycle period.

25. The apparatus of claim 21, wherein the at least one processor is further configured to:
transmit the at least one uplink control channel during the first time interval upon expiration of the off-cycle period.

26. The apparatus of claim 21, wherein the at least one processor is further configured to:
upon expiration of the first time interval, increase the duration of the off-cycle period responsive to determining the overload metric still exceeds the threshold value.

27. The apparatus of claim 21, wherein:
selectively not transmitting at least a portion of the uplink control channel during a second time interval for a duration of the modified off-cycle period includes selectively not transmitting one or more acknowledgement messages during the second time interval for the duration of the modified off-cycle period.

28. The apparatus of claim 21, wherein the at least one processor is further configured to:
transmit one or more radio link control acknowledgement messages corresponding to one or more packets on an uplink data channel during the first time interval for the duration of the off-cycle period.

29. The apparatus of claim 21, wherein the at least one processor configured to modify the transmit power is further configured to:
reduce a maximum transmit power limit (MTPL) of a power amplifier (PA) associated with at least one uplink channel during the first time interval.

30. The apparatus of claim 29, wherein the at least one processor configured to modify the transmit power is further configured to:
  periodically reduce the MTPL for the at least one uplink channel based on a power back-off value during one or more down timer periods during the first time interval.

31. A computer-program product for wireless communication, the computer-program product comprising a non-transitory computer-readable medium having code stored thereon, the code executable by one or more processors for:
  determining whether an overload metric has exceeded a corresponding threshold value;
  modifying a transmit power of at least one uplink control channel during a first time interval if the overload metric has exceeded the corresponding threshold value, by selectively not transmitting at least a portion of the uplink control channel during an off-cycle period of the first time interval;
  determining, after expiration of the first time interval, whether the overload metric still exceeds the threshold value;
  modifying a duration of the off-cycle period based at least in part on the overload metric; and
  selectively not transmitting at least a portion of the uplink control channel during a second time interval for a duration of the modified off-cycle period.

32. The computer-program product of claim 31, wherein the overload metric is a temperature metric.

33. The computer-program product of claim 31, wherein the portion of the uplink control channel selectively not transmitted comprises one or more acknowledgment messages corresponding to one or more received packets.

34. The computer-program product of claim 31, wherein the code for modifying the transmit power further comprises:
  code for selectively not transmitting one or more hybrid automatic repeat request (HARQ) messages of a physical uplink control channel (PUCCH) during the first time interval for a duration of the off-cycle period.

35. The computer-program product of claim 31, further comprising:
  code for transmitting the at least one uplink control channel during the first time interval upon expiration of the off-cycle period.

36. The computer-program product of claim 31, further comprising:
  code for upon expiration of the first time interval, increasing the duration of the off-cycle period responsive to determining the overload metric still exceeds the threshold value.

37. The computer-program product of claim 31, wherein:
  selectively not transmitting at least a portion of the uplink control channel during a second time interval for a duration of the modified off-cycle period includes selectively not transmitting one or more acknowledgement messages during the second time interval for the duration of the modified off-cycle period.

38. The computer-program product of claim 31, further comprising:
  code for transmitting one or more radio link control acknowledgement messages corresponding to one or more packets on an uplink data channel during the first time interval for the duration of the off-cycle period.

39. The computer-program product of claim 31, wherein the code for modifying the transmit power further comprises:
  code for reducing a maximum transmit power limit (MTPL) of a power amplifier (PA) associated with at least one uplink channel during the first time interval.

40. The computer-program product of claim 39, wherein the code for modifying comprises:
  code for periodically reducing the MTPL for the at least one uplink channel based on a power back-off value during one or more down timer periods during the first time interval.

* * * * *